United States Patent
Olson et al.

[11] Patent Number: 6,124,644
[45] Date of Patent: Sep. 26, 2000

[54] SINGLE CORE DUAL CIRCUIT HEAT EXCHANGE SYSTEM

[75] Inventors: Gregg Olson, Racine; Benjamin Gover, Oak Creek, both of Wis.

[73] Assignee: Modine Manufacturing Company, Racine, Wis.

[21] Appl. No.: 09/006,145

[22] Filed: Jan. 13, 1998

[51] Int. Cl.[7] ............................................. H02P 9/04
[52] U.S. Cl. ............................ 290/1 B; 290/1 R; 290/2; 290/1 B; 180/65.2; 180/69.6; 180/165
[58] Field of Search .......................... 165/51, 44, 140, 165/174, 916; 123/41.21, 41.31; 180/65.2, 69.6

[56] References Cited

U.S. PATENT DOCUMENTS

| | | | |
|---|---|---|---|
| 4,620,509 | 11/1986 | Crofts | 123/41.1 |
| 4,677,942 | 7/1987 | Hayashi | 123/41.21 |
| 4,698,761 | 10/1987 | Cooper et al. | 364/424 |
| 4,920,750 | 5/1990 | Iishiki et al. | 60/671 |
| 4,995,431 | 9/1990 | Saur et al. | 165/1 |
| 4,995,447 | 2/1991 | Weidmann et al. | 165/44 |
| 5,186,245 | 2/1993 | Peters | 165/140 |
| 5,327,987 | 7/1994 | Abdelmalek | 180/65.2 |
| 5,351,487 | 10/1994 | Abdelmalek | 60/618 |
| 5,531,285 | 7/1996 | Green | 180/65.2 |
| 5,669,338 | 9/1997 | Pribble et al. | 123/41 |
| 5,794,689 | 8/1998 | Ghiani | 165/140 |
| 5,823,250 | 10/1998 | Barten et al. | 165/10 |

*Primary Examiner*—Elvin Enad
*Attorney, Agent, or Firm*—Wood, Phillips, VanSanten, Clark & Mortimer

[57] ABSTRACT

A system has an engine (24), a generator (28) driven by the engine (24) to generate a DC voltage, and an inverter (30) electrically coupled to the generator (28) to convert the DC voltage to an AC signal. The system also has a first heat exchange circuit (44) in heat exchange relationship with the engine (24) to remove heat from the engine (24), and a second heat exchange circuit (46) in heat exchange relationship with the inverter (30) to remove heat from the inverter (30). The system further has a single radiator (38) divided into first and second sections (40, 42), the first section (40) being substantially hydraulically isolated from fluid communication with the second section (42). The first section (40) of the radiator (38) is in fluid communication with the first heat exchange circuit (44), and the second section (42) is in fluid communication with the second heat exchange circuit (46).

17 Claims, 2 Drawing Sheets

SINGLE CORE DUAL CIRCUIT HEAT EXCHANGE SYSTEM

FIELD OF THE INVENTION

This invention is directed to a heat exchange system having a single core which is in fluid communication with two heat exchange circuits, and in particular, to a heat exchange system having a single core which is in fluid communication with a first heat exchange circuit in heat exchange relationship with an engine and a second heat exchange circuit in heat exchange relationship with an inverter.

BACKGROUND OF THE INVENTION

It is known in the art to have a vehicle, such as a bus, with a drive assembly powered by a traction motor. It is also known in the art to combine an internal combustion engine with a generator to produce a DC voltage that is stored in a battery or batteries. The voltage of the DC battery or batteries is inverted by an inverter into an AC signal which is provided to the traction motor. This arrangement allows the engine to constantly operate at its most efficient speed.

The engine, the inverter and the traction motor all generate heat. It is therefore necessary to equip the vehicle with a heat exchange system to remove a substantial portion of the heat generated by the engine, the inverter and the traction motor from the vehicle.

One way in which the heat can be removed is by equipping the vehicle with a single core radiator and a single heat exchange circuit in fluid communication with the single core radiator and in heat exchange relationship with the engine, the inverter and the traction motor. However, to protect the inverter, it is necessary to keep the operating temperature of the coolant in heat exchange relationship with the inverter relatively low, approximately 70 C.

Given the low operating temperature required to protect the inverter, it would be necessary in such a system to reject a large amount of waste heat from the radiator at a relatively low temperature differential between the coolant and the ambient air. The size of a single core radiator required by the operating criterion described above would be probatively large when compared with the size of the vehicle on which the radiator would be mounted.

SUMMARY OF THE INVENTION

According to an aspect of the invention, a system has an engine, a generator driven by the engine to generate a DC voltage, and an inverter electrically coupled to the generator to convert the DC voltage to an AC signal. The system also has a first heat exchange circuit in heat exchange relationship with the engine to remove heat from the engine, and a second heat exchange circuit in heat exchange relationship with the inverter to remove heat from the inverter. The system further has a single radiator divided into first and second sections, the first section being substantially hydraulically isolated from fluid communication with the second section. The first section of the radiator is in fluid communication with the first heat exchange circuit, and the second section is in fluid communication with the second heat exchange circuit.

In a preferred embodiment, the inverter supplies AC power to a traction motor for driving a vehicle.

The first section of the radiator may have a first heat exchange zone and the second section of the radiator may have a second heat exchange zone, the first zone being larger than the second zone.

Moreover, the first section of the radiator may have a first plurality of tubes through which a coolant from the first heat exchange circuit may pass. The second section of the radiator may have a second plurality of tubes through which a coolant from the second heat exchange circuit may pass. The number of tubes in the first plurality of tubes may be greater than the number of tubes in the second plurality of tubes. In particular, the ratio of the number of tubes in the first plurality of tubes to the number of tubes in the second plurality of tubes may be about 6:1.

Further, the radiator may have a first tank, a second tank, a first plurality of tubes in fluid communication with the first and second tanks so that a coolant may pass between the first tank and the second tank through the first plurality of tubes and a second plurality of tubes in fluid communication with the first and second tanks so that a coolant may pass between the first tank and the second tank through the second plurality of tubes. The radiator may have first and second ports in fluid communication with the first tank in spaced relation to one another and first and second ports in fluid communication with the second tank in spaced relation to one another, two of the ports serving as inlets and two of the ports serving as outlets. One inlet and outlet may be in fluid communication with the first plurality of tubes and the first heat exchange circuit and the other inlet and outlet may be in fluid communication with the second plurality of tubes and the second heat exchange circuit. The radiator may have a first baffle disposed in the first tank between the first and second ports therein to hydraulically isolate the first port therein from the second port therein and a second baffle disposed in the second tank between the first and second ports therein to hydraulically isolate the first port therein from the second port therein to hydraulically isolate the first plurality of tubes from the second plurality of tubes. The number of tubes in the first plurality of tubes may be greater than the number of tubes in the second plurality of tubes.

The first heat exchange circuit may have a first pump disposed between the engine and the port serving as the inlet between the radiator and the first heat exchange circuit to circulate a coolant in the first heat exchange circuit. The second heat exchange circuit may have a second pump disposed between the inverter and the port serving as the outlet between the radiator and the second heat exchange circuit to circulate a coolant in the second heat exchange circuit.

The system may include a traction motor electrically coupled to the inverter, and an air compressor driven by the engine. The first heat exchange circuit may be in heat exchange relationship with the traction motor and the air compressor. The engine may be an internal combustion engine.

DETAILED DESCRIPTION OF THE PREFERRED EMBODIMENT

Figure 1:
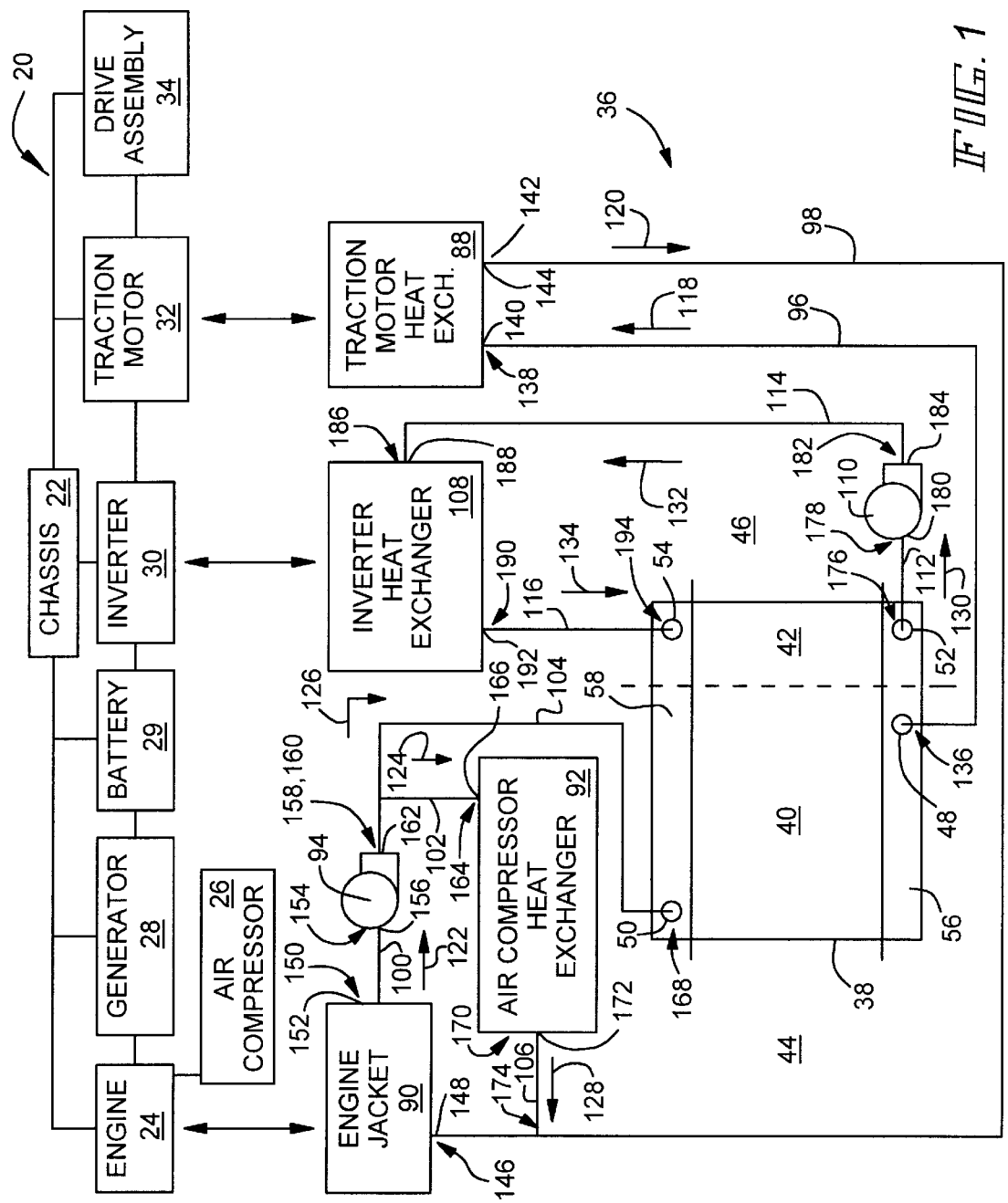
FIG. 1 is a block diagram of a heat exchange system according to the present invention having a radiator with a single core, the core in fluid communication with a first heat exchange circuit in heat exchange relationship with an engine and in fluid communication with a second heat exchange circuit in heat exchange relationship with an inverter.

A vehicle 20 is shown in FIG. 1. The vehicle 20 has a chassis 22 which mounts an engine 24, an air compressor 26, a generator 28, a battery or battery assembly 29, an inverter 30, a traction motor 32 and a drive assembly 34. The engine 24, preferably a 230 horsepower diesel engine available under the T444E tradename from Navistar, drives the generator 28 to generate a DC voltage which is stored in the battery or battery assembly 29. The inverter 30 is electrically coupled to the battery or battery assembly 29 to invert the DC voltage of the battery or battery assembly 29 into an AC signal. The AC signal from the inverter 30 is used to power the traction motor 32, which drives the drive assembly 34 to propel the vehicle 20.

The vehicle 20 also has a heat exchange system 36. The heat exchange system 36 includes a single core, single pass radiator 38 with first and second sections 40, 42 which are hydraulically separated from each other as will be explained in greater detail below. The heat exchange system 36 also includes first and second heat exchange circuits 44, 46. The first heat exchange circuit 44 is connected to the first section 40 between a first port 48 and a second port 50 of the radiator 38. The first heat exchange circuit 44 is in heat exchange relationship with the engine 24, the air compressor 26 and the traction motor 32 to cool each. The second heat exchange circuit 46 is connected to the second section 42 between a first port 52 and a second port 54 of the radiator 38. The second heat exchange circuit 46 is in heat exchange relationship with the inverter 30 to cool the same.

Figure 2:
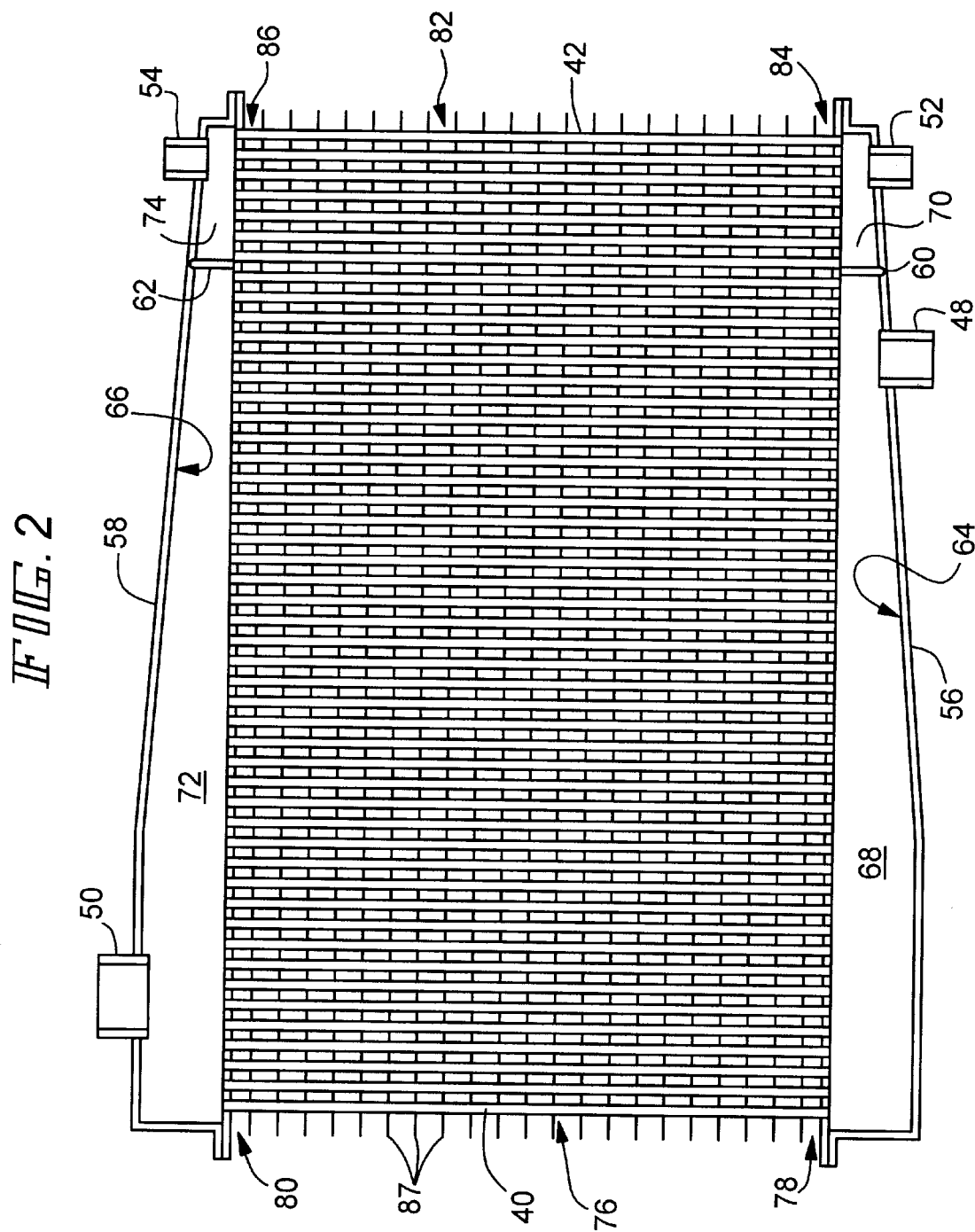
FIG. 2 is a cross-sectional view of the radiator of FIG. 1.

With reference to FIG. 2, the radiator 38 has a first tank 56 and a second tank 58. The first ports or outlets 48, 52 are formed in the first tank 56, while the second ports or inlets 50, 54 are formed in the second tank 58. The first ports 48, 52 are spaced from each other along the length of the first tank 56, and the second ports 50, 54 are spaced from each other along the length of the second tank 58.

A baffle 60 is disposed in the first tank 56 between the first ports 48, 52. A similar baffle 62 is disposed in the second tank 58 between the second ports 50, 54. The baffles 60, 62 are secured to the interior walls 64, 66 of the first and second tanks 56, 58 to substantially prevent the communication of fluid between the first ports 48, 52 in the first tank 56 and the second ports 50, 54 in the second tank 58. That is, the baffles 60, 62 provide hydraulic isolation between the ports 48, 52 as well as between the ports 50, 54. The baffles 60, 62 may be of any shape, but should preferably conform to the shape of the interior walls 64, 66.

The baffle 60 separates the first tank 56 into two first headers 68, 70. Similarly, the baffle 62 separates the second tank into two second headers 72, 74.

A first plurality of tubes 76, which may be thin, flat tubes of non-circular cross-section, are disposed between the first header 68 and the second header 72. The tubes 76 are secured and sealed to the first header 68 at ends 78 and the second header 72 at ends 80 such that fluid from the second header 72 may pass through the tubes 76 to the first header 68. The tubes 76 are connected to the respective headers on one side of the baffles 60, 62. The tubes 76 present a first heat exchange zone for heat exchange between a coolant in the tubes and the ambient.

A second plurality of tubes 82, which also may be thin, flat tubes of non-circular cross-section, are disposed between the first header 70 and the second header 74. The tubes 82 are secured and sealed to the first header 70 at ends 84 and the second header 74 at ends 86 such that fluid from the second header 74 may pass through the tubes 82 to the first header 70. The tubes 82 are connected to the respective headers on the side of the baffles 60, 62 opposite the tubes 76. The second plurality of tubes 82 presents a second heat exchange zone for heat exchange between a coolant in the tubes and the ambient.

Because of the baffles 60, 62 in the first and second tanks 56, 58, substantially all of the fluid passing from the second header 72 to the first header 68 passes through the tubes 76, while substantially all of the fluid passing from the second header 74 to the first header 70 passes through the tubes 82.

As seen in FIG. 2, the number of tubes 76 is greater than the number of tubes 82. Stated slightly differently, the heat exchange zone of the first section 40 is greater than the heat exchange zone of the second section 42.

While the number of tubes 76, 82 in the first and second sections 40, 42 is dependent on the flow rate in the circuits 44, 46 necessary to optimize the heat transfer, according to one embodiment of the present invention, there are 282 tubes in the first plurality of tubes 76, and 48 tubes in the second plurality of tubes 82. The ratio of the tubes 76 to the tubes 82 is thus approximately about 6:1.

The radiator 38 also includes air side fins 87 which promote heat exchange between the tubes 76, 82 and the cooling air flow.

As shown in FIG. 1, the radiator 38 is in fluid communication with the first heat exchange circuit 44 which includes a traction motor heat exchange assembly 88, an engine jacket 90, an air compressor heat exchanger 92, a pump 94, and conduits 96, 98, 100, 102, 104, 106. The radiator 38 is also in fluid communication with the second heat exchange circuit 46 which includes an inverter heat exchanger 108, a pump 110, and conduits 112, 114, 116. Arrows 118, 120, 122, 124, 126, 128, 130, 132, 134 show the direction of flow of first and second coolants through the first and second circuits 44, 46 and the radiator 38.

The first heat exchange circuit 44 is assembled as follows. The conduit 96 is attached at a first end 136 to the first port 48 of the radiator 38, and at a second end 138 to an inlet 140 of the traction motor heat exchanger assembly 88. The traction motor heat exchanger assembly 88 preferably includes a first heat exchanger in a direct heat exchange relationship with the traction motor 32 and using oil as the coolant, and a second heat exchanger wherein the oil is allowed to reject heat into the coolant stream passing through the first heat exchange circuit 44.

The conduit 98 is attached at a first end 142 to an outlet 144 of the traction motor heat exchanger assembly 88, and at a second end 146 to an inlet 148 of the engine jacket 90.

The conduit 100 is attached at a first end 150 to an outlet 152 of the engine jacket 90. The conduit 100 is also attached at a second end 154 to an inlet 156 of the pump 94.

The conduits 102 and 104 are attached at first ends 158, 160 to an outlet 162 of the pump 94. The conduit 102 is attached at a second end 164 to an inlet 166 of the air compressor heat exchanger 92. The conduit 104 is attached at a second end 168 to an inlet 50 of the radiator 38.

The conduit 106 is attached at a first end 170 to an outlet 172 of the air compressor heat exchanger 92. The conduit 106 is also attached at a second end 174 to the conduit 98.

The second heat exchange circuit 46 is assembled as follows. The conduit 112 is attached at a first end 176 to the first port 52 of the radiator 38. The conduit 112 is attached at a second end 178 to an inlet 180 of the pump 110.

The conduit 114 is attached at a first end 182 to an outlet 184 of the pump 110. The conduit 114 is also attached at a second end 186 to an inlet 188 of the inverter heat exchanger 108.

The conduit 116 is attached at a first end 190 to an outlet 192 of the inverter heat exchanger 108. The conduit 116 is attached at a second end 194 to the second port 54 of the radiator 38.

In operation, a first coolant would be circulated in the first circuit 44 as shown by arrows 118, 120, 122, 124, 126, 128. The coolant leaves the radiator 38 through the first port or outlet 48 of the first section 40 of the radiator 38 in the direction of arrow 118. The coolant exits the radiator 38 at an approximate temperature of 91 C. (195° F.), with a flow rate of approximately 187 kg/min (412 lbs./min.).

The coolant passes through the conduit 96 into the inlet 140 of the traction motor heat exchanger 88. The coolant absorbs approximately 1.14 Mj/min. (1081 Btu/min.) as it passes through the traction motor heat exchanger 88. The coolant exits the traction motor heat exchanger 88 through the outlet 144 at a temperature of 91.7 C. (197° F.).

The coolant then passes through the conduit 98 in the direction of arrow 120. Before the coolant enters the engine jacket 90, it is combined with coolant which has passed through the air compressor heat exchanger 92. The coolant exiting the air compressor heat exchanger 92 has an approximate temperature of 104 C. (220° F.), with a flow rate of 9 kg/min (20 lbs./min.). The coolant which passed through the air compressor heat exchanger 92 absorbed approximately 211 kj/min. (200 Btu/min.). As a consequence, the coolant entering the engine jacket 90 has a temperature of approximately 92 C. (198° F.), with a flow rate of 196 kg/min. (432 lbs./min.).

The coolant passing through the engine jacket 90 absorbs 5.34 Mj/min. (5060 Btu/min.). The coolant emptying from the engine jacket 90 through outlet 152 into the conduit 100 does so at a temperature of approximately 99 C. (210° F.), with a flow rate of 196 kg/min. (432 lbs./min.). Shortly after the coolant exits the pump 94, the coolant divides into the conduits 102, 104, the conduit 102 returning to the air compressor heat exchanger 92, and the conduit 104 returning to the second port or inlet 50 of the section of the radiator 38.

The coolant entering the radiator 38 through the inlet 50 is at a temperature of approximately 99 C. (210° F.) and at a flow rate of 187 kg/min. (412 lbs./min.). The first section 40 of the radiator 38 allows 6.67 Mj/min. (6341 Btu/min.) to be rejected to the ambient environment (approximately 49 C. (120° F.)), thus lowering the temperature of the coolant to 91 C. (195° F.).

In the second circuit 46, the coolant exits the first port or outlet 52 of the second section 42 of the radiator 38 at a temperature of 63 C. (146° F.) and at a flow rate of 30.5 kg/min. (67 lbs./min.). The coolant passes through the inlet 188 into the inverter heat exchanger 108, wherein the coolant absorbs 510 kj/min. (484 Btu/min.). This raises the temperature of the coolant exiting the inverter heat exchanger 108 at outlet 192 to 67 C. (153° F.). The second section 42 of the radiator 38 allows 510 kj/min. (484 Btu/min.) to be rejected to the ambient environment to return the temperature of the coolant to 63 C. (146° F.).

Thus, it is recognized that during operation, the temperature of the coolant circulating in the first circuit 44 is approximately 27 C. (49° F.) higher than temperature of the coolant circulating in the second circuit 46 at the outlets 48, 52 of the radiator 38, and approximately 32 C. (57° F.) higher at the inlets 50, 54 of the radiator 38. As a consequence, the heat exchange system 36 provides for rejection of heat for the first circuit 44 in heat exchange relationship with the engine 24 at a substantially higher temperature differential relative to the ambient temperature than in the second circuit 46, while also allowing the coolant in the second circuit 46 to remain at a substantially lower temperature to protect the inverter 30.

While the first coolant has been shown flowing through the first circuit 44 from the port 48 to the port 50 and the second coolant flowing through the second circuit 46 from the port 52 to the port 54, it is recognized that the flow of the coolants in either or both of the circuits could be reversed. If the flow of one or both of the coolants is reversed, then it may be necessary to change the position of the pumps 94, 110 relative to the ports so that the pump 94 remains connected between the outlet 152 of the engine jacket 90 and the first circuit radiator inlet, and the pump 110 remains connected between the second circuit radiator outlet and the inlet 188 of the inverter heat exchanger 108.

Still other aspects, objects and advantages of the present invention can be obtained from a study of the specification, the drawings, and the appended claims.

We claim:

1. A system comprising:

an engine;

a generator driven by the engine to generate a DC voltage;

an inverter electrically coupled to the generator to convert the DC voltage to an AC signal;

a first heat exchange circuit in heat exchange relationship with the engine to remove heat from the engine;

a second heat exchange circuit in heat exchange relationship with the inverter to remove heat from the inverter; and a single radiator divided into first and second sections, the first section being hydraulically isolated from fluid communication with the second section, the first section being in fluid communication with the first heat exchange circuit, and the second section being in fluid communication with the second heat exchange circuit.

2. The system according to claim 1, wherein the first section of the radiator has a first heat exchange zone and the second section of the radiator has a second heat exchange zone, the first zone being larger than the second zone.

3. The system according to claim 1, wherein:

the first section of the radiator has a first plurality of tubes through which a coolant from the first heat exchange circuit may pass; and the second section of the radiator has a second plurality of tubes through which a coolant from the second heat exchange circuit may pass, the number of tubes in the first plurality of tubes being greater than the number of tubes in the second plurality of tubes.

4. The system according to claim 3, wherein the ratio of the number of tubes in the first plurality of tubes to the number of tubes in the second plurality of tubes is about 6:1.

5. The system according to claim 1, wherein:

the radiator has a first tank, a second tank, a first plurality of tubes in fluid communication with the first and second tanks so that a coolant may pass between the first tank and the second tank through the first plurality of tubes and a second plurality of tubes in fluid communication with the first and second tanks so that a coolant may pass between the first tank and the second tank through the second plurality of tubes;

the radiator has first and second ports in fluid communication with the first tank in spaced relation to one another and first and second ports in fluid communication with the second tank in spaced relation to one another, two of said ports serving as inlets and two of said ports serving as outlets;

one inlet and outlet are in fluid communication with the first plurality of tubes and the first heat exchange circuit and the other inlet and outlet are in fluid communication with the second plurality of tubes and the second heat exchange circuit; and the radiator has a first baffle disposed in the first tank between the first and second ports therein to hydraulically isolate the first port therein from the second port therein and a second baffle disposed in the second tank between the first and second ports therein to hydraulically isolate the first port therein from the second port therein to hydraulically isolate the first plurality of tubes from the second plurality of tubes.

6. The system according to claim 5, wherein the number of tubes in the first plurality of tubes is greater than the number of tubes in the second plurality of tubes.

7. The system according to claim 5, wherein:

the first heat exchange circuit comprises a first pump disposed between the engine and the port serving as the inlet between the radiator and the first heat exchange circuit to circulate a coolant in the first heat exchange circuit; and the second heat exchange circuit comprises a second pump disposed between the inverter and the port serving as the outlet between the radiator and the second heat exchange circuit to circulate a coolant in the second heat exchange circuit.

8. The system according to claim 5, further comprising a first coolant in the first heat exchange circuit and a second coolant in the second heat exchange circuit, the operating temperature of the first coolant in the first heat exchange circuit being greater than the operating temperature of the second coolant in the second heat exchange circuit.

9. The system according to claim 5, further comprising a first coolant in the first heat exchange circuit and a second coolant in the second heat exchange circuit, the operating temperature of the first coolant at the port serving as the inlet between the radiator and first heat exchange circuit being greater than the operating temperature of the second coolant at the port serving as the inlet between the radiator and the second heat exchange circuit and the operating temperature of the first coolant at the port serving as the outlet between the radiator and the first heat exchange circuit being greater than the operating temperature of the second coolant at the port serving as the outlet between the radiator and the second heat exchange circuit.

10. The system according to claim 1, further comprising:

a traction motor electrically coupled to the inverter; and an air compressor driven by the engine;

wherein the first heat exchange circuit is in heat exchange relationship with the traction motor and the air compressor.

11. The system according to claim 1, wherein the engine is an internal combustion engine.

12. A vehicle comprising:

a chassis;

an internal combustion engine on the chassis;

a generator driven by the engine to generate a DC voltage;

an inverter electrically coupled to the generator to convert the DC voltage to an AC signal;

a traction motor electrically coupled to the inverter;

a drive assembly on the chassis and hydraulically coupled to and driven by the traction motor to propel the vehicle;

a first heat exchange circuit in heat exchange relationship with the engine to remove combustion heat from the engine;

a second heat exchange circuit in heat exchange relationship with the inverter to remove heat from the inverter; and a single radiator divided into first and second sections, the first section being hydraulically isolated from fluid communication with the second section, the first section being in fluid communication with the first heat exchange circuit, and the second section being in fluid communication with the second heat exchange circuit.

13. The vehicle according to claim 12, wherein:

the radiator has a first tank, a second tank, a first plurality of tubes in fluid communication with the first and second tanks so that a coolant may pass between the first tank and the second tank through the first plurality of tubes and a second plurality of tubes in fluid communication with the first and second tanks so that a coolant may pass between the first tank and the second tank through the second plurality of tubes;

the radiator has first and second ports in fluid communication with the first tank in spaced relation to one another and first and second ports in fluid communication with the second tank in spaced relation to one another, two of said ports serving as inlets and two of said ports serving as outlets;

one inlet and outlet are in fluid communication with the first plurality of tubes and the first heat exchange circuit and the other inlet and outlet are in fluid communication with the second plurality of tubes and the second heat exchange circuit; and the radiator has a first baffle disposed in the first tank between the first and second ports therein to hydraulically isolate the first port therein from the second port therein and a second baffle disposed in the second tank between the first and second ports therein to hydraulically isolate the first port therein from the second port therein to hydraulically isolate the first plurality of tubes from the second plurality of tubes.

14. The vehicle according to claim 13, wherein the number of tubes in the first plurality of tubes is greater than the number of tubes in the second plurality of tubes.

15. The vehicle according to claim 13, wherein:

the first heat exchange circuit comprises a first pump disposed between the engine and the port serving as the inlet between the radiator and the first heat exchange circuit to circulate a coolant in the first heat exchange circuit; and the second heat exchange circuit comprises a second pump disposed between the inverter and the port serving as the outlet between the radiator and the second heat exchange circuit to circulate a coolant in the second heat exchange circuit.

16. The vehicle according to claim 15, wherein the first heat exchange circuit additionally is in heat exchange relationship with the traction motor.

17. The vehicle according to claim 12, further comprising a first coolant in the first heat exchange circuit and a second coolant in the second heat exchange circuit, the operating temperature of the first coolant in the first heat exchange circuit being greater than the operating temperature of the second coolant in the second heat exchange circuit.

* * * * *